United States Patent Office 3,721,673
Patented Mar. 20, 1973

3,721,673
SUBSTITUTED PYRROLEMETHYLAMINES
Charles Harmon Tilford, De Kalb, Ga., assignor to Richardson-Merrell, Inc., New York, N.Y.
No Drawing. Filed May 14, 1970, Ser. No. 37,313
Int. Cl. C07d 87/10
U.S. Cl. 260—268 H                10 Claims

ABSTRACT OF THE DISCLOSURE

Disclosed as novel compounds useful as hypotensive and antihypertensive agents are compounds having the formula

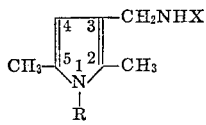

wherein R is cycloalkyl of 5 to 7 carbon atoms, pyridyl, methylpyridyl, quinolyl, phenyl, a mono- or di-substituted phenyl group in which case the substituents may be halogen, (lower)alkyl of 1 to 3 carbon atoms, lower alkoxy of 1 to 4 carbon atoms or di(lower)alkylamino having 1 to 4 carbon atoms in each alkyl group, or aralkyl such as phenethyl or α-methylbenzyl; and X is (A) The group

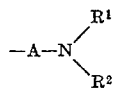

wherein A is a straight or branched alkylene chain of 2 or 6 carbon atoms; $R^1$ and $R^2$ may be the same or different and represent hydrogen, alkyl of 1 to 3 carbon atoms, hydroxyalkyl, di(lower) alkylaminoalkyl, cycloalkyl of from 5 to 7 carbon atoms, phenyl, phenyl substituted with (lower)alkyl, or $R^1$ and $R^2$ together with the nitrogen atom to which they are attached may be a saturated heterocyclic group such as pyrrolidino, piperidino, morpholino, piperazino or N-(lower alkyl)piperazino, (B) The group

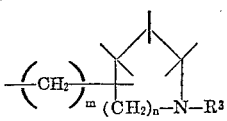

wherein $m$ is a whole integer of from 0 to 3 with the proviso that when $m$ is 0 the point of attachment of X may not be at either carbon atom alpha to the nitrogen atom; $n$ is a whole integer of 1 or 2 and $R^3$ is hydrogen or (lower)alkyl; or (C) The group

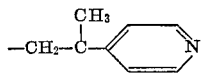

and the acid addition salts of said compounds. The novel compounds may be prepared from trisubstituted pyrrolecarboxaldehydes by reaction with primary amines followed by reduction to the corresponding pyrrolemethylamines or by a Mannich type reaction of a trisubstituted pyrrole with a primary or secondary amine and formaldehyde.

---

This invention relates to novel substituted pyrrolemethylamines and to processes for preparing the same. More particularly, this invention relates to novel trisubstituted pyrrolemethylamines which have hypotensive activity and are useful as antihypertensive agents and to processes for preparing the same.

The novel substituted pyrrolemethylamines of this invention may be represented by the general formula

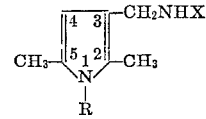

wherein R is cycloalkyl of 5 to 7 carbon atoms, pyridyl, methylpyridyl, quinolyl, phenyl, a mono- or di-substituted phenyl group in which case the substituents may be halogen, lower(alkyl) of 1 to 3 carbon atoms, lower alkoxy of 1 to 4 carbon atoms or di(lower)alkylamino having 1 to 4 carbon atoms in each alkyl group, or aralkyl such as phenethyl or α-methylbenzyl; and X is (A) the group

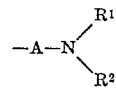

wherein A is a straight or branched alkylene chain of 2 to 6 carbon atoms; $R^1$ and $R^2$ may be the same or different and represent hydrogen, alkyl of 1 to 3 carbon atoms, hydroxyalkyl, di(lower)alkylaminoalkyl, cycloalkyl of from 5 to 7 carbon atoms, phenyl, phenyl substituted with (lower)alkyl, or $R^1$ and $R^2$ together with the nitrogen atom to which they are attached may be a saturated heterocyclic group such as pyrrolidino, piperidino, morpholino, piperazino, or N-(lower alkyl)piperazino, (B) the group

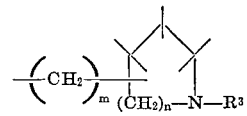

wherein $m$ is a whole integer of from 0 to 3 with the proviso that when $m$ is 0 the point of attachment of X may not be at either carbon atom alpha to the nitrogen atom; $n$ is a whole integer of 1 or 2 and $R^3$ is hydrogen or (lower)alkyl; or (C) the group

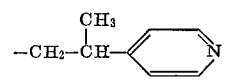

and the acid addition salts of said compounds.

As examples of the radicals which R may represent in compounds of this invention having the above formula, there may be mentioned, for example, cyclopentyl; cyclohexyl; cycloheptyl; phenyl; a phenyl radical substituted by one or two substituents selected from halogen, such as fluorine, chlorine, bromine or iodine, lower alkyl such as methyl, ethyl, or propyl, lower alkoxy such as methoxy, ethoxy or propoxy, and di-loweralkylamino such as dimethylamino, diethylamino and the like; as well as such radicals as α-methylbenzyl, phenethyl, pyridyl, methylpyridyl and quinolyl.

As examples of the substituents which $R^1$ and $R^2$ may represent in the compounds of this invention having the above formula, there may be mentioned for example alkyl such as methyl, ethyl, propyl; hydroxyalkyl such as, hydroxyethyl, hydroxypropyl and the like; di(lower)alkylaminoalkyl such as dimethylaminoethyl and diethylaminoethyl and the like; cycloalkyl such as cyclopentyl, cyclohexyl, cycloheptyl; as well as phenyl and lower alkyl substituted phenyl such as methylphenyl, ethylphenyl and the like. Additionally, $R^1$ and $R^2$ together with the nitrogen atom to which they are attached may represent a saturated heterocyclic group such as pyrrolidino, piperidino, morpholino, piperazino and N-(lower alkyl)piperazino.

As examples of the substituents which A may represent in the compounds of this invention having the above formula, there may be mentioned for example, ethylene, propylene, butylene, pentylene and hexylene, β-methylpropylene and the like.

The invention also includes the pharmaceutically acceptable acid addition salts of the compounds of the hereinbefore set forth formula such as those salts with inorganic acids such as, for example, hydrochloric, hydrobromic, sulphuric, phosphoric acids and the like and with organic carboxylic acids such as for example, acetic propionic, glycolic, lactic, pyruvic, malonic, succinic, fumaric, malic, tartaric, citric, ascorbic, maleic, hydroxymaleic, dihydroxymaleic, benzoic, phenylacetic, 4-aminobenzoic, 4-hydroxybenzoic, anthranilic, cinnamic salicylic, 4-aminosalicylic, 2-phenoxybenzoic, 2-acetoxybenzoic acid and the line. As examples of compounds of this invention there may be mentioned for example:

2,5-dimethyl-1-phenyl-N-(2-piperazinoethyl)-3-pyrrolmethylamine,
2,5-dimethyl-1-phenyl-N-(2-piperazinoethyl)-3-pyrrolemethylamine,
2,5-dimethyl-1-phenyl-N-[2-(4-piperidyl)ethyl]-3-pyrrolemethylamine,
2,5-dimethyl-N-[2-(4-piperidyl)ethyl]-1-[2-(m-xylyl)]-3-pyrrolemethylamine,
2,5-dimethyl-N-[3-(4-methylpiperazino)propyl]-1-phenyl-3-pyrrolemethylamine,
2,5-dimethyl-N-(3-aminopropyl)-1-[2-(m-xylyl)]-3-pyrrolemethylamine,
2,5-dimethyl-1-cyclohexyl-N-(4-piperidylmethyl)-3-pyrrolemethylamine,
2,5-dimethyl-1-(6-methyl-2-pyridyl)-N-(2-piperazinoethyl)-3-pyrrolemethylamine,
2,5-dimethyl-N-(4-piperidylmethyl)-1-(8-quinolyl)-3-pyrrolemethylamine,
2,5-dimethyl-(2,5-dimethoxyphenyl)-N-(4-piperidylmethyl)-3-pyrrolemethylamine,
2,5-dimethyl-1-(α-methylbenzyl)-N-(4-piperidylmethyl)-3-pyrrolemethylamine,
1-(2,6-dichlorophenyl)-2,5-dimethyl-N-(4-piperidylmethyl)-3-pyrrolemethylamine,
2,5-dimethyl-N-(4-piperidylmethyl)-1-[2-(m-xylyl)]-3-pyrrolemethylamine,
2,5-dimethyl-1-[p-(dimethylamino)phenyl]-N-(4-piperidylmethyl)-3-pyrrolemethylamine,
2,5-dimethyl-1-phenethyl-N-(4-piperidylmethyl)-3-pyrrolemethylamine,
2,5-dimethyl-N-(4-piperidylmethyl)-1-(3-pyridyl)-3-pyrrolemethylamine,
2,5-dimethyl-1-phenyl-N-(3-piperazinopropyl)-3-pyrrolemethylamine,
N-(3-aminopropyl)-2,5-dimethyl-1-phenyl-3-pyrrolemethylamine,
N-{3-[(2-hydroxyethyl)amino]propyl}-2,5-dimethyl-1-phenyl-3-pyrrolemethylamine,
N-[2-(N-ethyl-m-toluidino)ethyl]-2,5-dimethyl-1-phenyl-3-pyrrolemethylamine,
N-[3-(cyclohexylamino)propyl]-2,5-dimethyl-1-phenyl-3-pyrrolemethylamine,
N-(3-diethylaminopropyl)-2,5-dimethyl-1-phenyl-3-pyrrolemethylamine,
N-{2-[2-(diethylamino)ethylamino]ethyl}-2,5-dimethyl-1-phenyl-3-pyrrolemethylamine,
2,5-dimethyl-1-phenyl-N-(2-pyrrolidinoethyl)-3-pyrrolemethylamine,
2,5-dimethyl-N-[2-(1-methyl-2-pyrrolidyl)ethyl]-1-phenyl-3-pyrrolemethylamine,
N-(1-ethyl-3-piperidyl)-2,5-dimethyl-1-phenyl-3-pyrrolemethylamine,
2,5-dimethyl-N-(3-morpholinopropyl)-1-phenyl-3-pyrrolemethylamine,
2,5-dimethyl-1-phenyl-N-[2-(4-pyridyl)propyl]-3-pyrrolemethylamine,
2,5-dimethyl-N-(4-piperidylmethyl)-1-(2-pyridyl)-3-pyrrolemethylamine, and the like and acid addition salts thereof.

The novel compounds of this invention have hypotensive activity and are useful as antihypertensive agents and can be used in the form of pharmaceutical preparations which contain the novel compounds suitable for oral or parenteral administration. The pharmaceutical preparations can be solid or liquid, such as, for example, tablets, capsules, solutions, suspensions or emulsions. The quantity of the novel compound in the unit dosage can vary over a wide range, for example, to provide from about 0.1 mg./kg. to about 50 mg./kg. of body weight of the animal per dose to achieve the desired antihypertensive effect. The hypertensive effect can be obtained for example by consumption of 10 mg. to 250 mg. tablets taken one to four times daily.

The compounds of this invention are effective as antihypertensive agents and can be used to relieve hypertensive conditions such as neurogenic or renal hypertension. Illustratively, when the compound of Example 2 was orally administered to unanesthetized hypertensive dogs at a dosage level of 30 mg./kg., the average decrease in mean arterial blood pressure was 25%, lasting longer than five hours. Similarly, in anesthetized normotensive dogs dosage of 30 mg./kg. of the compound of Example 1 results in an average decrease in mean arterial blood pressure of 72% (lasting more than three hours) upon intraduodenal administration and 34% (lasting longer than 1½ hours) when administered orally. Intravenous administration of the compounds of Examples 1 and 2 at 0.1 and 1.0 mg./kg., respectively, resulted in a 75% drop in mean arterial blood pressure in anesthetized normotensive dogs.

The compounds of this invention may be prepared by reacting a trisubstituted pyrrolecarboxaldehyde with a primary amine to form a pyrrolemethylimine which is then reduced to the novel compounds of this invention as shown by the following reaction scheme:

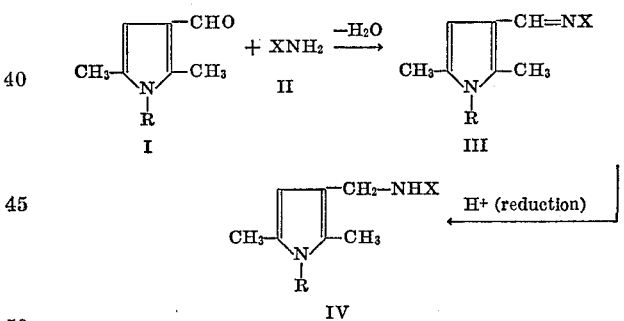

wherein R and X are as defined hereinbefore. This process for preparing the compounds of the invention generally utilizes equimolar amounts of the reactants I and II although an excess molar concentration of one of the reactants may also be employed if desired. Generally, the trisubstituted pyrrolecarboxaldehyde is dissolved in a suitable water immiscible solvent such as, for example, toluene, benzene, xylene or cyclohexane and the like, with stirring and heating to a temperature of about 70° to about 100° C. The amine reactant II is then added in a single portion and the reaction mixture is refluxed and the theoretical amount of water collected in a water trap. Although the reaction is generally carried out in a water immiscible solvent other solvents such as lower alcohols, for example, methanol or ethanol, may be employed in this reaction by using a Soxhlet extraction apparatus with molecular sieves used in the thimble for separation of the water. After removal of the solvent the imine condensation product III is isolated and generally used without purification.

The pyrrolemethylimine condensation product III is then reduced to the novel trisubstituted pyrrolemethylamines of this invention by any suitable reduction process. For example, the pyrrolemethylimine may be reduced to the desired amine by dissolving the imine in a small amount of ethanol or methanol and adding to an 80–100% excess of potassium borohydride or sodium borohydride in methanol or ethanol with stirring. With continued stirring, the solvent is removed and the amine residue treated with a small amount of water and sodium hydroxide. The pyrrolemethylamine may be extracted with toluene, benzene or xylene for example. For further purification the amine is extracted into dilute acetic acid or dilute acetic acid containing a small amount of dilute hydrochloric acid. This solution is then made alkaline and reextracted into toluene. The dry toluene extract is concentrated to an oil and purified, for example, by vacuum distillation.

Similarly, the reduction of the pyrrolemethylamines may also be effected by using lithium aluminum hydride or by any suitable catalytic reduction techniue. The resulting pyrrolemethylamines may then be isolated in the usual manner.

The trisubstituted pyrrolecarboxaldehyde used in the preparation of the compounds of this invention may be prepared, for example, by reacting equimolar amounts of a primary aliphatic, cycloalkyl or aromatic amine and acetonylacetone with a small amount of acetic acid in toluene and refluxing for about 14 hours, or by the method of H. Broadbent et al., J. Heterocyclic Chem. 5, 757 (1968). The 1-substituted-2,5-dimethylpyrrole thus obtained is dissolved in N,N-dimethylformamide and toluene to which phosphorous oxychloride is added over a period of fifteen minutes with cooling and stirring. The mixture is stirred for about 14 hours at about 100° C., then cooled and treated with a saturated sodium acetate solution. Evaporation of a toluene extract of the reaction mixture gives a residue which is distilled or recrystallized from 85% methanol to yield the desired 1-substituted-2,5-dimethylpyrrole-3-carboxaldehyde [R. Rips and N. Buu-Hoi, J. Org. Chem. 24, 372 (1959)]. Table I discloses exemplary 1-substituted-2,5-dimethylpyrrole - 3 - carboxaldehydes used in subsequent reactions for the preparation of the compounds of this invention.

TABLE I

Pyrrole-3-carboxaldehydes

| R | B.P., °C./mm. pressure | M.P., °C. |
|---|---|---|
| phenyl | Commercially available | |
| cyclohexyl | | 89–91 |
| 2,6-dimethylphenyl | | 113–115 |
| 2,5-dimethoxyphenyl | | 106–108 |
| α-methylbenzyl | 155/0.05 | |
| 2,5-dichlorophenyl | 146–8/0.5 | |
| phenethyl (–CH₂CH₂–) | | 57–59 |
| 2-pyridyl | 141–2/0.5 | |
| 3-pyridyl | 155–6/0.1 | |
| 6-methyl-pyran-2-yl (CH₃, O) | 155–6/0.1 | |
| 1-naphthyl | | 119–122 |
| 4-(dimethylamino)phenyl | | 117–119 |

In addition to the process described hereinbefore, many of the compounds of this invention may be prepared by the Mannich type reaction wherein a trisubstituted pyrrole is reacted with a primary amine in the presence of formaldehyde as shown by the following reaction scheme:

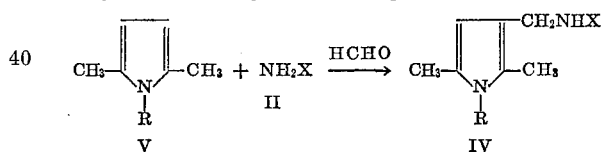

in which R and X are as defined hereinbefore except that R may not be a phenyl radical substituted with dialkylamino or lower alkoxy and X may not be a group containing a primary or secondary amine. The reaction is most generally conducted with equimolar portions of the reactants at a temperature not in excess of 60° C. Generally, the trisubstituted pyrrole, V, and the primary or secondary amine, II, are reacted in the presence of a formalin solution, with stirring and at such a rate that the temperature does not exceed 60° C. The resulting reaction mixture is diluted with water, extracted with ether and the aqueous layer poured into a solution of about 25% sodium hydroxide from which the product, IV, is purified in any suitable manner, such as, by crystallization or the like.

The following examples are illustrative of the invention:

EXAMPLE 1

Preparation of 2,5-dimethyl-1-phenyl-N-[2-(4-pyridyl)-ethyl]-3-pyrrolemethylamine To a solution of 25 g. (0.125 mole) of 2,5-dimethyl-1-phenylpyrrole-3-carboxaldehyde in 200 ml. of toluene heated to 100° C. was added 16 g. (0.125 mole) of 4-(2-aminoethyl)piperidine in one portion. While refluxing the mixture, 2.25 ml. of water was removed within three hours, after which the solvent was evaporated and the residual oil added to an equal volume of anhydrous ethanol. This mixture was combined with a cooled, stirred solution of 12.5 g. of potassium borohydride in 200 ml. of methanol over a period of one-half hour. The mixture was stirred overnight at room temperature and the solvent evaporated. Water (150 ml.) was then added, followed by 150 ml. of toluene and 10 g. of sodium hydroxide with continued stirring. The separated toluene layer was extracted with 150 ml. of 10% acetic acid and the toluene layer discarded. The aqueous acetic acid portion was treated with 20 g. of solid potassium hydroxide, extracted with 200 ml. of toluene, and evaporated to give an oily residue. Distillation of this residue yielded 25 g. of 2,5-dimethyl-1-phenyl-N-[2-(4-piperidyl)-ethyl]-3-pyrrolemethylimine, B.P. 182–4° C. (0.07 mm.).

The imine was also prepared by refluxing the 2,5-dimethyl-1-phenylpyrrole-3-carboxaldehyde and 4-(2-aminoethyl)piperidine in anhydrous ethanol in a Soxhlet extraction apparatus which contains molecular sieves in the extraction thimble. The resulting alcohol solution was then used directly by addition to a stirred sodium borohydride solution in ethanol to give a solution of the desired product.

The dihydrogen citrate salt was prepared and purified from a 4:1 methanol; 2-propanol mixture, yielding 32 g. of 2,5-dimethyl-1-phenyl-N-[2-(4-piperidyl)-ethyl]-3-pyrrolemethylamine dihydrogen citrate, M.P. 188–9° C.

EXAMPLE 2

Preparation of 2,5-dimethyl-1-phenyl-N-(2-piperazinoethyl)-3-pyrrolemethylamine

To a solution of 100 g. (0.5 mole) of 2,5-dimethyl-1-phenyl-3-pyrrolecarboxaldehyde in 700 ml. toluene heated to 90° C. was added 70 g. (0.54 mole) of 2-aminoethylpiperazine in one portion with stirring. While refluxing the mixture for 1½ hours, 9 ml. of water was removed after which the solvent was evaporated and the residue dissolved in a one-third volume of ethanol and added over a period of 1½ hours to a stirred mixture of 50 g. potassium borohydride in 700 ml. of methanol at 5–10° C. After stirring overnight at room temperature, the solvent was removed and the residue was treated with 200 ml. of water and combined with 35 g. NaOH with stirring. Toluene extraction of the resulting oil was followed by extraction with an excess of 25% acetic acid. The aqueous acetic acid portion was treated with solid potassium hydroxide, extracted with toluene, and distilled (B.P. 189–192° C./0.06 mm.) to yield 95 g. crude 2,5-dimethyl-1-phenyl-N-(2 - piperazinoethyl)-3-pyrrolemethylimine product, a portion of which was purified by redistillation, B.P. 186° C. (0.08 mm.).

The residue containing the imine intermediate may be dissolved in anhydrous diethyl ether and added to excess lithium aluminum hydride in ether to give an ether solution of the desired product, after work-up in the usual manner.

The sulfate salt was prepared and purified from methanol to yield 33 g. of 2,5-dimethyl-1-phenyl-N-(2-piperazinoethyl)-3-pyrrolemethylamine sulfate hemihydrate, M.P. 238–9° C.

EXAMPLE 3

Preparation of 2,5-dimethyl-1-phenyl-N-(4-piperidylmethyl)-3-pyrrolemethylamine

Employing the method decribed in Example 2, 30 g. (0.15 mole) of 2,5-dimethyl-1-phenyl-3-pyrrolecarboxaldehyde was reacted with 17.1 g. (0.15 mole) of 4-aminomethylpiperidine in 350 ml. of toluene to give after reduction 2,5-dimethyl-1-phenyl-N-(4-piperidylmethyl)-3-pyrrolemethylamine, B.P. 178–80° C. (0.1 mm.).

The ethanol solution of the imine intermediate can also be reduced by catalytic reduction under hydrogen of two to four atmospheres pressure using, for example, supported palladium or a platinum oxide catalyst.

The sulfate hemihydrate salt melting above 300° C. and the citrate salt, M.P. 185–7° C., were prepared.

EXAMPLE 4

Preparation of 2,5-dimethyl-N-[3-(4-methylpiperazino)propyl]-1-phenyl-3-pyrrolemethylamine trihydrochloride hydrate Employing the method described in Example 2, 20 g. (0.1 mole) of 2,5-dimethyl-1-phenyl-3-pyrrolecarboxaldehyde and 16 g. (0.1 mole) of N-(3-aminopropyl)-N'-methylpiperazine were combined with 100 ml. of toluene, refluxed, and approximately 1.8 ml. of water was collected. The solvent was evaporated and the residue dissolved in an equal volume of ethanol and added to a cooled, stirred mixture of 10 g. of potassium borohydride in 200 ml. of methanol. The mixture was stirred overnight, the solvent evaporated at 100° C., decomposed and extracted with toluene which was evaporated. The residual oil was dissolved in 200 ml. of ethanol and acidified to Congo red with alcoholic hydrogen chloride. The mixture was cooled and filtered yielding 10 g. of 2,5-dimethyl-N-[3-(4 - methylpiperazino)propyl]-1-phenyl-3-pyrrolemethylamine trihydrochloride hydrate, M.P. 235–8° C. (dec.).

Alternately, a solution of 26.9 g. (0.1 mole) of N-(3-aminopropyl)-N'-methylpiperazine trihydrochloride in 7.5 g. (0.1 mole) of 40% formalin was added with stirring under nitrogen atmosphere to 17.1 g. (0.1 mole) of 2,5-dimethyl-1-phenyl-pyrrole at such a rate that the temperature did not exceed 60° C. The reaction mixture was stirred for one-half hour and diluted with an equal volume of water. The resulting solution was washed with diethyl ether and the washings discarded. The aqueous layer was then made alkaline by the addition of 25 percent sodium hydroxide solution and ether extracted. The extract was dried over anhydrous magnesium sulfate, filtered and the solvent removed at reduced pressure. The ether solution was treated with alcoholic hydrogen chloride to give 2,5-dimethyl - N - [3-(4 - methylpiperazino)propyl]-1-phenyl-3-pyrrolemethylamine trihydrochloride hydrate.

EXAMPLE 5

Preparation of N-(3-aminopropyl)-2,5-dimethyl-1-[2-(m-xylyl)]-3-pyrrolemethylamine A solution of 20 g. (0.1 mole) of 2,5-dimethyl-1-[2-(m-xylyl)]-3-pyrrolecarboxaldehyde in 200 ml. of toluene was added over a period of 3½ hours to a stirred, refluxing solution of 40 g. (0.54 mole) of 1,3-diaminopropane in 200 ml. of toluene and the water collected with stirring. By the reduction procedure of Example 1, 14 g. of N - (3 - aminopropyl) - 2,5 - dimethyl-1-[2-(m-xylyl)]-3-pyrrolemethylamine was obtained, B.P. 155–7° C. (0.5 mm.). Treatment with 9.5 g. of citric acid in methanol yielded 21 g. of the citrate salt, M.P. 187–9° C. (dec.).

EXAMPLE 6

Preparation of 1-cyclohexyl-2,5-dimethyl-N-(4-piperidylmethyl)-3-pyrrolemethylamine Employing the method described in Example 1, 10.2 g. (0.05 mole) of 1-cyclohexyl-2,5-dimethyl-1-pyrrolecarboxaldehyde, 7.9 g. (0.055 mole) of 4-aminomethylpiperidine, and 100 ml. toluene were reacted and reduced to yield 9 g. of 1-cyclohexyl-2,5-dimethyl-N-(4-piperidylmethyl)-3-pyrrolemethylamine, B.P. 178–81° C. (0.05 mm.). The dihydrochloride salt was prepared, M.P. 259–62° C. (dec.).

EXAMPLE 7

Preparation of 2,5-dimethyl-1-(6-methyl-2-pyridyl)-N-(2-piperazinoethyl)-3-pyrrolemethylamine Employing the method described in Example 2, 18 g. (0.085 mole) of 2,5-dimethyl-1-(6-methyl-2-pyridyl)-3-pyrrolecarboxaldehyde, 12 g. (0.01 mole) of 1-(2-aminoethyl)piperazine and 180 ml. of toluene were reacted and subsequently reduced with potassium borohydride to yield 2,5 - dimethyl - 1 - (6-methyl-2-pyridyl)-N-(2-piperazinoethyl)-3-pyrrolemethylamine, B.P. 204–6° C. (0.05 mm.). This material was converted to the sulfate, M.P. 248–51° C. (dec.).

EXAMPLE 8

Preparation of 2,5-dimethyl-N-(4-piperidylmethyl)-1-(8-quinolyl)-3-pyrrolemethylamine Employing the method described in Example 2, 4 g. of 2,5 - dimethyl-1-(8-quinolyl)-3-pyrrolecarboxaldehyde, 2 g. of 4-aminomethyl piperidine, and 30 ml. of toluene were reacted and then reduced to yield 2 g. of 2,5-dimethyl-N - (4-piperidylmethyl)-1-(8-quinolyl)-3-pyrrolemethylamine, B.P. 225–7° C. (0.05 mm.). The trihydrochloride, M.P. 273–6° C. (dec.) and the citrate, M.P. 200–2° C. (dec.) salts were prepared.

EXAMPLE 9

Preparation of 1-(2,5-dimethoxyphenyl)-2,5-dimethyl-N-(4-piperidylmethyl)-3-pyrrolemethylamine Employing the procedure described in Example 4, 13 g. (0.45 mole) of 1-(2,5-dimethoxyphenyl)-2,5-dimethyl-3-pyrrolecarboxaldehyde, 5.7 g. (0.05 mole) of 4-aminomethylpiperidine, and 100 ml. of toluene were reacted and reduced to yield 1-(2,5-dimethoxyphenyl)-2,5-dimethyl - N - (4 - piperidylmethyl) - 3-pyrrolemethylamine. The crude product was converted directly to the dihydrochloride salt hemihydrate, M.P. 264–6° C. (dec.).

EXAMPLE 10

Preparation of 2,5-dimethyl-(α-methylbenzyl)-N-(4-piperidylmethyl)-3-pyrrolemethylamine Employing the method of Example 1, 12 g. (0.05 mole) of 2,5-dimethyl-1-(α-methylbenzyl)-3-pyrrolecarboxaldehyde, 5.7 g. (0.05 mole) of 4-aminomethylpiperidine and 100 ml. toluene were reacted then reduced with potassium borohydride to yield 2,5-dimethyl-1-(α-methylbenzyl)-N-(4-piperidylmethyl)-3-pyrrolemethylamine, B.P. 192–3° C. (0.07 mm.).

The following compounds were prepared from the appropriate trisubstituted pyrrolecarboxaldehyde by the method of Example 1:

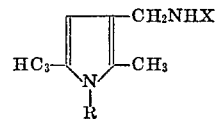

| Example number | R | X | B.P., °C./ mm. pressure | Salt | Salt M.P., °C |
|---|---|---|---|---|---|
| 11 | 2,6-dichlorophenyl | —CH₂—(4-piperidyl)NH | 190–3/0.05 | | |
| 12 | 2,6-dimethylphenyl | —CH₂—(4-piperidyl)NH | 163–5/0.05 | Citrate | [1] 191–2 |
| 13 | (CH₃)₂N—C₆H₄— | —CH₂—(4-piperidyl)NH | 214/0.05 | Citrate·½H₂O | [1] 190–2 |
| 14 | C₆H₅—CH₂CH₂— | —CH₂—(4-piperidyl)NH | 188–9/0.08 | 2HCl | [1] 214–6 |
| 15 | 3-pyridyl | —CH₂—(4-piperidyl)NH | 189–90/0.05 | Citrate·H₂O | [1] 139–40 |
| 16 | 2,6-dimethylphenyl | —(CH₂)₂—(4-piperidyl)NH | 183–5/0.05 | Citrate·½H₂O | [1] 175–77 |
| 17 | phenyl | —(CH₂)₃—N(4-piperidyl)NH | 202–4/0.1 | do | [1] 201–2 |
| 18(a) | phenyl | —(CH₂)₃—NH₂ | 155–6/0.1 | Citrate·½H₂O | [1] 180–2 |
| 18(b) | phenyl | —(CH₂)₃—NH₂ | | 2HCl | [1] 227–8 |
| 19 | phenyl | —(CH₂)₃NH(CH₂)₂OH | 195/0.1 | Citrate·H₂O | [1] 140 |
| 20 | phenyl | —(CH₂)₂—N(C₂H₅)(4-methylphenyl) | | 2HCl | [1] 189–90 |
| 21 | phenyl | —(CH₂)₂NH—(4-piperidyl) | 190/0.15 | 2HCl | [1] 209–10 |

See footnotes at end of table.

TABLE—Continued

| Example number | R | X | B.P., °C./ mm. pressure | Salt | Salt M.P., °C |
|---|---|---|---|---|---|
| 22 | 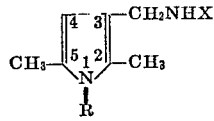 | —(CH₂)₃N(C₂H₅)₂ | | 2HCl | 196–7 |
| 23 | 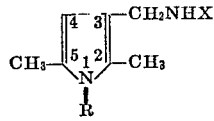 | —(CH₂)₂NH(CH₂)N(C₂H₅)₂ | 172–5/0.08 | | |
| 24 | 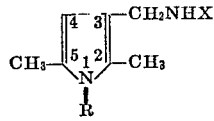 | —(CH₂)₂—N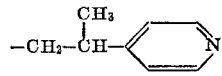 | 173–6/0.1 | 2HCl | [1] 180–1 |
| 25 | 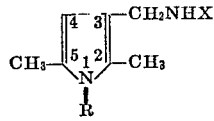 | —(CH₂)₂—N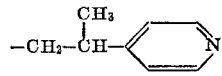CH₃ | 173–6/0.08 | Citrate·1/2H₂O | [1] 65 |
| 26 | 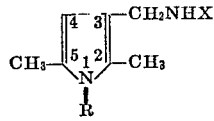 | 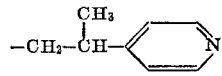N–C₂H₅ | 173–5/0.1 | Citrate | [2] 91–5 |
| 27 | 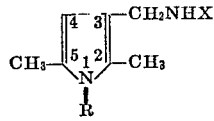 | —(CH₂)₂—N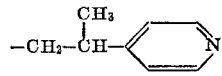O | 182–5/0.15 | 2HCl | [1] 246–7 |
| 28 | 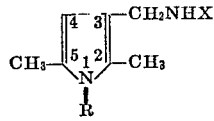 | —CH₂—CH(CH₃)—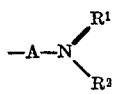N | | 2HCl·H₂O | [1] 178–9 |
| 29 | 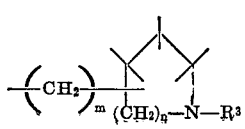 | —CH₂—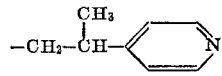NH | 181–3/0.05 | | |

[1] Dec.  [2] Sinter.

What is claimed is:
1. A compound of the formula

$$CH_3 \underset{\underset{R}{N}}{\overset{4\ 3}{\underset{5\ 2}{\left|\right|}}} \begin{array}{c} -CH_2NHX \\ -CH_3 \end{array}$$

wherein R is cycloalkyl of 5 to 7 carbon atoms, pyridyl, methylpyridyl, quinolyl, phenyl, a mono- or di-substituted phenyl group in which case the substituents are halogen, (lower) alkyl of 1 to 3 carbon atoms, lower alkoxy of 1 to 4 carbon atoms or di(lower) alkylamino having 1 to 4 carbon atoms in each alkyl group, or aralkyl selected from phenethyl or α-methylbenzyl; and X is (A) the group $$-A-N\begin{array}{c}R^1\\R^2\end{array}$$

wherein A is a straight or branched alkylene chain of 2 to 6 carbon atoms; $R^1$ and $R^2$ may be the same or different and represent hydrogen, alkyl of 1 to 3 carbon atoms, hydroxyalkyl of from 1 to 3 carbon atoms, di(lower)alkylaminoalkyl having 1 to 3 carbon atoms in each alkyl group, cycloalkyl of from 5 to 7 carbon atoms, phenyl, phenyl substituted with (lower) alkyl, or $R^1$ and $R^2$ together with the nitrogen atom to which they are attached may be a saturated heterocyclic group selected from pyrrolidino, piperidino, morpholino, piperazino or N-(lower alkyl)piperazino, (B) the group

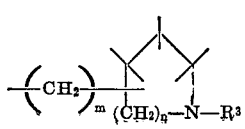

wherein m is a whole integer of from 0 to 3 with the proviso that when m is 0 the point of attachment of X may not be at either carbon atom alpha to the nitrogen atom; n is a whole integer of 1 or 2 and $R^3$ is hydrogen or (lower) alkyl; or (C) the group $$-CH_2-\underset{CH_3}{\overset{|}{CH}}-\begin{array}{c}\diagup\!\!\diagdown\\\diagdown\!\!\diagup\end{array}N$$

and the pharmaceutically acceptable acid addition salts of said compounds.

2. A compound of claim 1 wherein R is selected from the group consisting of cycloalkyl of 5 to 7 carbon atoms, pyridyl, phenyl, dihalophenyl, dimethylphenyl, phenethyl or α-methylbenzyl and X is (A) the group $$-A-N\begin{array}{c}R^1\\R^2\end{array}$$

wherein A is an alkylene chain of 2 or 3 carbon atoms; $R^1$ and $R^2$ may be the same or different and represent hydrogen, alkyl of 1 to 3 carbon atoms, phenyl substituted with lower alkyl or $R^1$ and $R^2$ taken together with the nitrogen atom to which they are attached is piperazino or N-(lower-alkyl)piperazino, or, (B) the group

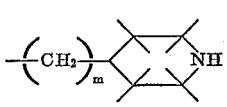

wherein m is the integer 1 or 2;

or a pharmaceutically acceptable acid addition salt thereof.

3. A compound of claim 2 wherein R is phenyl and X is the group

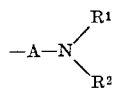

wherein A is an alkylene chain of 2 or 3 carbon atoms; $R^1$ and $R^2$ may be the same or different and represent hydrogen, alkyl of 1 to 3 carbon atoms, phenyl substituted with lower alkyl, or $R^1$ and $R^2$ together with the nitrogen atom to which they are attached is piperazino or N-(lower alkyl)piperazino;

or a pharmaceutically acceptable acid addition salt thereof.

4. A compound of claim 3 which is 2,5-dimethyl-1-phenyl-N-(2-piperazinoethyl)-3-pyrrolemethylamine or a pharmaceutically acceptable acid addition salt thereof.

5. A compound of claim 2 wherein R is selected from the group consisting of cycloalkyl of 5 to 7 carbon atoms, pyridyl, phenyl, dihalophenyl, dimethylphenyl, phenethyl or α-methylbenzyl and X is

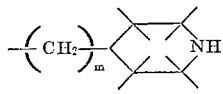

wherein $m$ is the integer 1 or 2; or a pharmaceutically acceptable acid addition salt thereof.

6. A compound of claim 5 which is 2,5-dimethyl-1-phenyl-N-(4-piperidylmethyl)-3-pyrrolemethylamine or a pharmaceutically acceptable acid addition salt thereof.

7. A compound of claim 5 which is 2,5-dimethyl-1-phenyl - N - [2-(4-piperidyl)ethyl]-3-pyrrolemethylamine or a pharmaceutically acceptable acid addition salt.

8. A compound of claim 5 which is 1-cyclohexyl-2,5-dimethyl-N-(4-piperidylmethyl)-3-pyrrolemethylamine or a pharmaceutically acceptable acid addition salt thereof.

9. A compound of claim 5 which is 2,5-dimethyl-N-[2 - (4 - piperidyl)ethyl]-1-[2-(m-xylyl)]-3-pyrrolemethylamine or a pharmaceutically acceptable acid addition salt thereof.

10. A compound of claim 5 which is 2,5-dimethyl-N-(4 - piperidylmethyl) - 1 - [2-(m-xylyl)]-3-pyrrolemethylamine or a pharmaceutically acceptable acid addition salt thereof.

References Cited

Herz et al., J. Org. Chem. 24, 201–4 (1959).

HENRY R. JILES, Primary Examiner

G. T. TODD, Assistant Examiner

U.S. Cl. X.R.

260—247.5 R, 288 R, 293.71, 296 R, 326.85, 240 K; 424—232, 248, 250, 258, 263, 267, 274